United States Patent [19]
Saita

[11] Patent Number: 6,152,212
[45] Date of Patent: *Nov. 28, 2000

[54] HEAT STORAGE SYSTEM AND HEAT RELEASE CONTROL METHOD

[75] Inventor: Kenji Saita, Ibaraki, Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/881,496

[22] Filed: Jun. 24, 1997

[30] Foreign Application Priority Data

Jun. 25, 1996 [JP] Japan ................................ 8-164380

[51] Int. Cl.$^7$ ........................................ F28B 17/00
[52] U.S. Cl. ........................ 165/10; 252/70; 165/902
[58] Field of Search ................... 165/10, 902; 252/70

[56] References Cited

U.S. PATENT DOCUMENTS

| | | | |
|---|---|---|---|
| 4,332,690 | 6/1982 | Kimura et al. | 165/902 X |
| 4,406,806 | 9/1983 | Despault et al. | 165/10 X |
| 4,415,465 | 11/1983 | Koike et al. | 165/10 X |
| 4,503,838 | 3/1985 | Arrhenius et al. | 165/10 X |
| 4,512,388 | 4/1985 | Claar et al. | 165/10 X |
| 4,574,051 | 3/1986 | Matthews et al. | 165/10 X |
| 4,817,704 | 4/1989 | Yamashita | 165/10 |
| 4,850,424 | 7/1989 | Mitani et al. | |
| 4,860,729 | 8/1989 | Benson et al. | 165/10 X |
| 4,953,628 | 9/1990 | Yamashita | 165/10 |
| 4,977,953 | 12/1990 | Yamagishi et al. | 165/10 |
| 5,143,048 | 9/1992 | Cheney, III. | |

FOREIGN PATENT DOCUMENTS

| | | |
|---|---|---|
| 2648678 | 5/1978 | Germany. |
| WO87 07630 | 12/1987 | WIPO. |

OTHER PUBLICATIONS

Patent Abstracts of Japan, vol. 012, No. 364 (M–747), Sep. 29, 1988.
Patent Abstracts of Japan, vol. 013, No. 048 (M–793), Feb. 3, 1989.
*McGraw–Hill Encyclopedia of Science & Technology*, 6th Edition, vol. 12, 1987, p. 209.
Tadashi Ohachi et al., "Electrical Nucleation and Growth of $NaCH_3COO \cdot 3H_2O$", *Journal of Crystal Growth*, vol. 99, 1990, pp. 72–76.

*Primary Examiner*—Christopher Atkinson
*Attorney, Agent, or Firm*—Sughrue, Mion, Zinn, Macpeak & Seas, PLLC

[57] ABSTRACT

A heat storage system comprising a heat storage material containing a salt hydrate, wherein the heat storage material comprises following three serial parts, (A) a seed crystal part in which a seed crystal is maintained, (B) a part functions as a switch by heating, or heating and cooling and (C) a main body part which can store and release heat, and a method for heat release control, wherein crystal spread from the seed crystal part (A) to the main body part (C) is controlled by the heating or cooling operation of the part (B) in the above-described heat storage system.

7 Claims, 2 Drawing Sheets

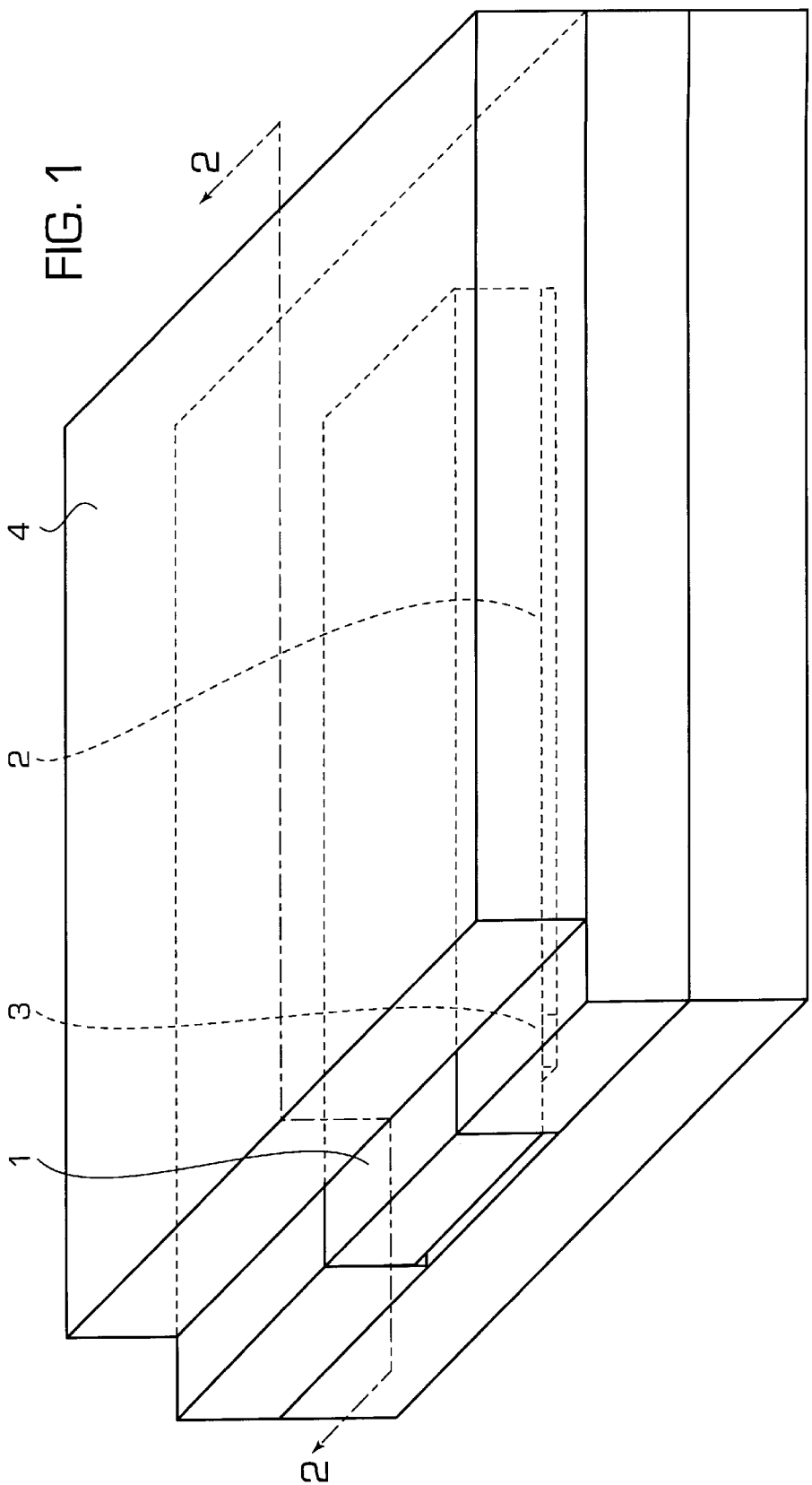

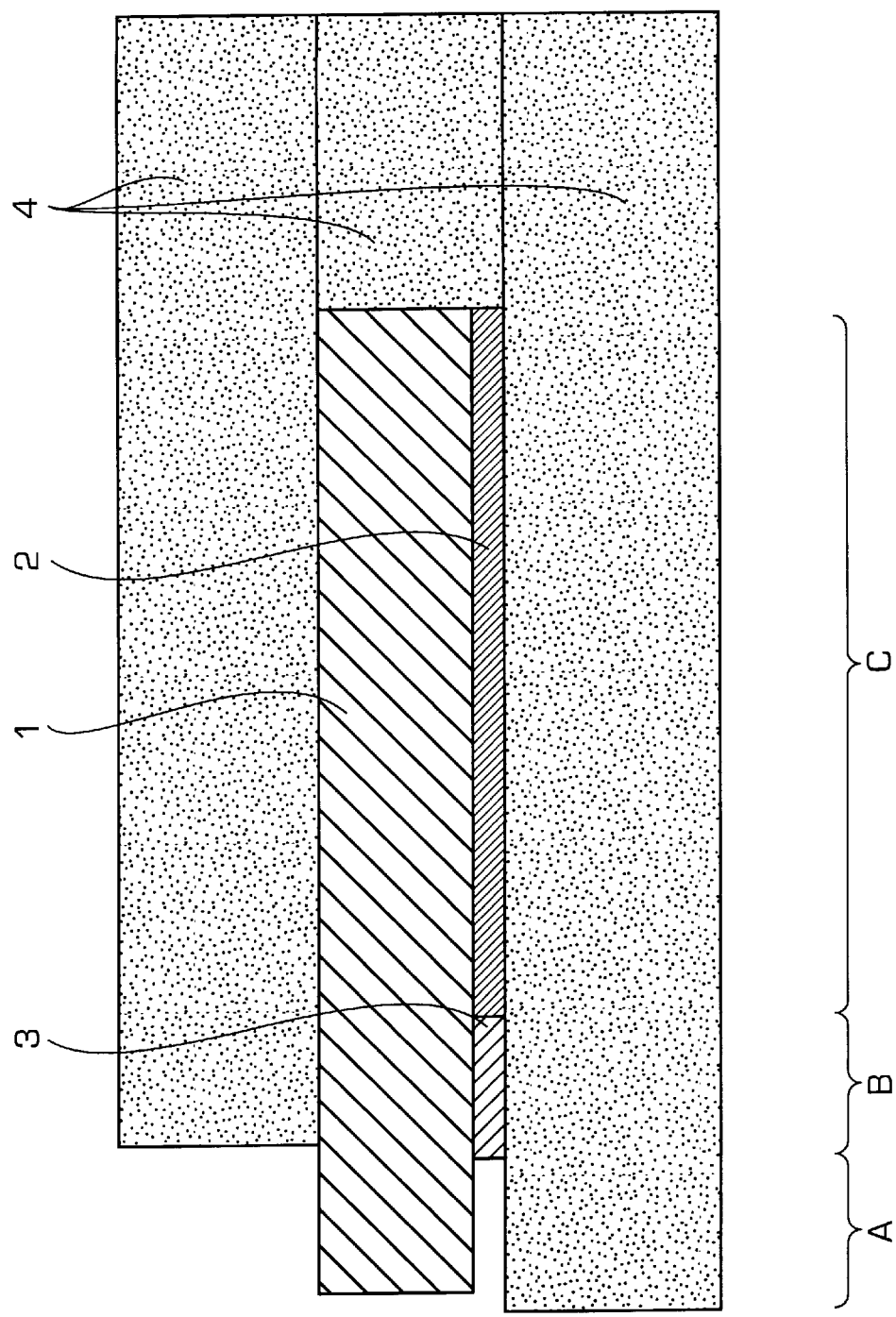

HEAT STORAGE SYSTEM AND HEAT RELEASE CONTROL METHOD

FIELD OF THE INVENTION

The present invention relates to a heat storage system and a heat release control method. More particularly, the present invention relates to a heat storage system and a heat release control method which are used for heating of buildings and the like.

PRIOR ART

A heat storage material should include a large amount of heat storage, heat storage and heat release at a given temperature level, stability for a long period of time, inexpensiveness, no toxicity, no corrosion property and the like. As a heat storage material which satisfies these conditions, a salt hydrate having phase changing property has been most frequently investigated. Representative example thereof include sodium sulfate decahydrate, disodium hydrogen phosphate dodecahydrate, sodium acetate trihydrate and the like, and some of them have been put into practice. In phase change, these salt hydrates generate a large amount of heat and they have a suitable temperature of phase change. However, there is a problem that some of them result in high supercooling. High supercooling causes that the temperature drops too much until heat release occurs, and is considered as an obstacle to practical use. Supercooling is a undesirable property of a salt hydrate and a supercooling inhibitor has been investigated for a long time.

However, high supercooling is advantageous because heat release time can be selected. For the purpose of heat storage, several suggestions have been made such as the formerly known method of adding seed crystal to conduct heat release. This method provides reliable heat release, but there are problems that the composition thereof is changed by repeated addition of seed crystal, and that the system has to be opened when adding the seed crystal to cause water evaporation, and that this addition is complicated and must be conducted frequently.

Moreover, there has been a known method in which crystallization is conducted by immersing electrodes in an aqueous solution of sodium acetate trihydrate and by applying voltage between the electrodes. However, the problems with this method are that the possibilities of elution of an electrode material and generated gas by electric current occurs, and that repeated use is limited by the systems' life span.

SUMMARY OF THE INVENTION

The present inventors have intensively studied a heat storage system which does not have the problems as described above, and have found that a heat storage system comprising the following three serial parts, (A) a seed crystal part, (B) a part which functions as a switch by heating, or heating and cooling and (C) a main body part which can store and release heat following in the order of (A), (B), (C), is stable in a long period thermal cycle since composition of the heat storage material does not change and can easily control the time when heat release is conducted from the supercooling condition of the heat storage material since the seed crystal is maintained, and have completed the present invention.

Namely, the present invention provides a heat storage system comprising a heat storage material containing a salt hydrate, wherein the heat storage material comprises the following three serial parts, (A) a seed crystal part in which a seed crystal is maintained, (B) a part which functions as a switch by heating, or heating and cooling and (C) a main body part which can store and-release heat.

BRIEF DESCRIPTION OF THE DRAWINGS

FIG. 1 illustrates schematically a heat storage system in accordance with the present invention; and FIG. 2 is a cross-sectional view of the heat storage system of FIG. 1 taken along line 2—2.

DETAILED DESCRIPTION OF THE INVENTION

The present invention will be described in detail below.

The heat storage material of the present invention comprises a salt hydrate. The above-described heat storage material is preferably used by packing in a vessel, and more preferably used by packing in a vessel which has no moisture permeating property. The shape of the vessel is not particularly restricted, and a vessel of any shape such as a cylinder, coil, flat plate and the like can be used. When a heat storage apparatus was used by laying under the floor, the vessel preferably has a high strength enough to stand a load.

The salt hydrate shows solid-liquid phase change by heating and cooling, and examples thereof include sodium sulfate decahydrate, disodium hydrogen phosphate dodecahydrate, sodium acetate trihydrate, calcium chloride hexahydrate, calcium nitrate tetrahydrate and the like. In the case of an incongruent salt hydrate, it is preferable to add a small excess of water and a solid-liquid separation inhibitor to avoid the formation of a lower hydrate. Small excess of water is selected from the stable range of a salt hydrate which is determined by solution equilibrium between a salt hydrate and water, and in may cases, it is from about $\frac{1}{10}$ to $\frac{1}{3}$ of the hydration mol number of the salt hydrate. Example of the solid-liquid separation inhibitor include water-soluble polymers, water-swellable polymers, high water-absorption resins, silica-based thickening agents and the like. In addition to these salt hydrates, melting point controlling agents, dispersing agents, defoaming agents, corrosion inhibitors, coloring agents and the like may be added.

The heat storage system of the present invention preferably includes an apparatus which can conduct heating and cooling, and an apparatus which can conduct heating, which are installed in the inner part or outer part of an vessel in which a heat storage material is packed. When the apparatus which can conduct heating and cooling, and the apparatus which can conduct heating, are installed in the inner part of the vessel, it is preferable that the apparatus is made of a material which causes no chemical reaction with the heat storage material.

The seed crystal part (A) comprises a salt hydrate crystal, and is always maintained at a temperature not higher than the melting point. To maintain the temperature not higher than the melting point, there may be adopted methods such as a forced cooling, heat release, heat insulation and the like according to the melting point thereof. The shape of the seed crystal part may be the shape of the whole vessel without any modification, may be a shape which is partially narrow, or may be a shape of which branch is took out into outer part.

The size of the seed crystal part may have a size which is required to maintain the temperature not higher than the melting point even if seed crystal part is under the influence of inflow of heat from the adjacent heating and cooling part.

For example, when the vessel is a flat plate vessel of 10 mm thickness ×300 mm width ×600 mm length, the length of the seed crystal part is preferably not less than 20 mm, more preferably not less than 50 mm.

The part (B) is a part which functions as a switch by heating, or heating and cooling. The part (B) is preferably an apparatus which can conduct heating and cooling. For the heating, electric heating or hot water is usually used. For the cooling methods such as thermoelectric cooling, water cooling, air cooling and the like are usually adopted. The shape of the part (B) may be as same as or different from (A) seed crystal part. The part (B) has such a size that at least a part of part (B) is completely molten in heating. For example, in the case of the above-described flat plate vessel, the length of the part (B) is preferably not less than 10 mm, more preferably not less than 20 mm.

The main body part (C) is a main part of the heat storage and heat release system which can conduct heat storage and heat release. For the heat storage, an equipment such as electric heating, hot water or the like is preferably used. When the heating is stopped after heat storage, the main body part (C) is cooled to be a supercooling condition. When the main body part (C) is cooled to be considerable low temperature, and consequently there is a fear of the break of supercooling, it is preferable to conduct suitable heat insulation to maintain the supercooling condition.

The heat storage material comprises these three part (A) to (C) following in the order of (A), (B), (C) is not separated by an air layer, heat insulation material and the like, and is of course continuous. Further, the heat storage material should have such a shape that a crystal can propagate from the seed crystal part (A) through the part (B) to which functions as a switch to the main body part (C). The shape of the section may have any shape such as circle, rectangle and the like, and is not particularly restricted. The sectional area is not particularly restricted if it has an area required for the propagation of a crystal.

The details of the heat release controlling method then will be described. In heat storage, the part (B) which functions as a switch and the main body part (C) are heated at a temperature not less than the melting point. After the both parts are fully molten, the heating of the main body part (C) is stopped and the heating of the part (B) is continued. Thus, the main body part (C) is cooled to be a temperature not more than the melting point. In this process, the main body part (C) is in a supercooling condition. When, the heat release is demanded, the heating of the part (B) which functions as a switch is stopped or the part (B) is cooled. By this procedure, the part (B) is cooled to be a temperature not more than the melting point, a crystallization is propagated from the seed crystal part (A) through the part (B) to the main body part (C). Thus, heat of crystallization is released with the progress of the crystallization. When large time difference of heat release from one end to the other end of the main body part (C) comes into question, the length of the main body part (C) is made shorter or divided into small sections and the like are preferred. To the contrary, the difference in the heat release times is to be utilized positively, it is preferred to make the length of the main body part (C) longer.

FIG. 2 depicts a cross-sectional diagram of the heat storage system of FIG. 1 at the indicated line 2—2. In FIG. 2, the heat storage system comprises a vessel 1 filled with a heat storage material which is divided into three continuous parts in the following order: a seed crystal part A in which a seed crystal is maintained, a switch part B which is controlled by a heater 3, and a main body part C which is controlled by a second heater 2. A heat insulating material 4 is provided.

According to the present invention, it becomes possible to control the heat release of a heat storage system comprises a heat storage material containing a salt hydrate, and it becomes possible to generate heat when necessary in heating of buildings, consequently, it becomes possible to operate the heat storage system more economically.

EXAMPLE

The following examples further illustrate the present invention in detail but are not to be construed to limit the scope thereof.

EXAMPLE 1

(An example of heat release control by operating the part (B) as a switch)

An aqueous solution (7.50 g) of sodium acrylate (20% by weight) obtained by neutralizing acrylic acid with sodium hydroxide to pH 7.0, 24.00 g of water, 15.84 g of disodium hydrogen phosphate anhydride were mixed and heated in a water bath of 50° C. to obtain a clear solution. Into this solution were dissolved 0.025 g of N,N'-methylenebisacrylamide and 0.03 g of potassium peroxodisulfate, then, to the resulting solution was added a solution prepared by dissolving 0.03 g of sodium sulfite into 2.01 g of water, and the resulting solution was immediately poured into a polyethylene bag having a size of 25 mm width ×300 mm length of which one end had been sealed, to obtain a water- containing gel (245 mm length, 10 mm thickness) having no flowability after 2 minutes. This gel was maintained overnight at 40° C., and was cooled to 15° C. to solidify the whole body. The mol number of water per 1 mol of disodium hydrogen phosphate anhydride in this composition was 16 mol. The solidified composition was divided into three parts, (A) 95 mm length, (B) 50 mm length and (C) 100 mm length, respectively. Thermocouples were adhered to each center part of them, respectively. Plane heaters were installed under the parts (B) and (C), respectively, and the upper and lower side of the parts (B) and (C) were wrapped with heat insulating materials having a thickness of 20 mm. The parts (B) and (C) were heated at 45° C. for 4 hours to be fully molten, and then the power source of the plane heater of (C) was turned off to lower the temperature of the center part of (C) to room temperature (21° C.) after 1 hours. However, the center part of (B) was maintained at 45° C. Next, the power source of the plane heaters of (B) was turned off after 2 hours, the temperature of the center part of (B) decreased to 30° C. then immediately increased again to 33° C., then this temperature was maintained for 90 minutes and then the temperature decreased gradually to room temperature. The temperature of center part of (C) steeply increased to be 29° C. after 2 minutes of re-increase of the temperature of (B).

Comparative Example 1

(An example in which heat release is not controlled since the part (B) does not function as a switch)

The same composition was used as in Example 1, and (B) and (C) were heated at 45° C. for 4 hours to be fully molten, and the power sources of plane heater of (B) and (C) were simultaneously turned off. Then the temperature of the center part of (B) decreased to 31° C. then immediately increased again to 32° C. The temperature of center part of (C) steeply increased (from 30° C. to 31° C.) after 2 minutes of re-increase of the temperature of the center part of (B).

Example 2

(An example of heat release control by operating the part (B) as a switch)

Sodium acetate anhydride (27.51 g) and 22.5l of water were mixed and heated in a water bath of 60° C. to obtain a clear solution. Into this solution was added 1.50 g of "Sumiflock FN-15H" (manufactured by Sumitomo Chemical Co., Ltd.) which was a partially hydrolized polyacrylamide and stirred for 5 minutes, then the resulting solution was poured into a polyethylene bag having a size of 25 mm width ×270 mm length of which one end had been sealed, and the bag was sealed. This bag was immersed in a water bath of 60° C. for 2 hours, then cooled to room temperature, opened and added several grains of seed crystals into this bag to crystallize whole body and the bag was re-sealed. The mol number of water per 1 mol of sodium acetate anhydride in this composition was 3.7 mol.

The solidified composition was divided into 3 parts in the same manner as in Example 1, and plane heaters and heat insulating materials were installed. The parts (B) and (C) were heated at 65° C. for 4 hours to be fully molten and then the power source of the plane heater of (C) was turned off, then the temperature of the center part of (C) lowered to 19° C. after 6 hours. However, the center part of (B) was maintained at 65° C. Next, the power source of the plane heater of (B) was turned off after 6 hours, the temperature of the center part of (B) decreased to 46° C. then immediately increased again to 48° C. The temperature of center part of (C) steeply increased to be 44° C. after 11 minutes of re-increase of the temperature of (B).

What is claimed is:

1. A heat storage system, comprising: a heat storage material containing a salt hydrate, the heat storage material comprising (A) a seed crystal part in which the seed crystal is maintained, (B) a switch part for controlling heating, or heating and cooling by the heat storage system and (C) a main body part for storing and releasing heat; and a heater for controlling the switch part; wherein the seed crystal part is always maintained at a temperature not higher than the melting point of the seed crystal, crystal propagation from the seed crystal part to the main body part, which is in a supercooled condition, is conducted by heating the switch part above, or conducted by cooling the switch part below, the melting point of the material of the switch part, and the salt hydrate heat storage material is connected in a continuous order of the seed crystal part, the switch part and the main body part.

2. A heat storage system, comprising: a heat storage material containing a salt hydrate packed in a vessel, the heat storage material comprising (A) a seed crystal part for maintaining a seed crystal, (B) a switch part for controlling heating, or heating and cooling by the heat storage system and (C) a main body part for storing and releasing heat; and a heater for controlling the switch part; wherein crystal propagation from the seed crystal part to the main body part is controlled by heating the switch part to above, or cooling the switch part to below, the melting point of the material of the switch part, and the salt hydrate heat storage material is connected in a continuous order of the seed crystal part, the switch part and the main body part.

3. The heat storage system according to claim 2, wherein the apparatus for conducting heating and cooling of the switch part is installed on an outer portion of the switch part, and the apparatus for conducting heating of the main body part is installed on an outer part of the main body part.

4. A method for controlling heat release from a heat storage system, comprising: a heat storage material containing a salt hydrate, the heat storage material comprising (A) a seed crystal part wherein a seed crystal is maintained, (B) a switch part for controlling heating, or heating and cooling by the heat storage system and (C) a main body part for storing and releasing heat; and a heater for controlling the switch part; the method comprising the step of controlling crystal propagation from the seed crystal part to the main body part by heating, or heating and cooling of the switch part of the heat storage system, wherein the seed crystal part is always maintained at a temperature not higher than the melting point of the seed crystal.

5. A method for controlling heat release from a heat storage system according to claim 4, wherein the heating of the switch part is continued so that no crystal propagation from the seed crystal part occurs, and crystal propagation from the seed crystal part to the main body part is conducted when the heating of the switch part has stopped or when the switch part has cooled.

6. A heat storage system according to claim 1, wherein the salt hydrate is selected from the group consisting of sodium sulfate decahydrate, disodium hydrogen phosphate dodecahydrate, sodium acetate trihydrate, calcium chloride hexahydrate and calcium nitrate tetrahydrate.

7. A method for controlling heat release from a heat storage system according to claim 4, wherein the salt hydrate is selected from the group consisting of sodium sulfate decahydrate, disodium hydrogen phosphate dodecahydrate, sodium acetate trihydrate, calcium chloride hexahydrate and calcium nitrate tetrahydrate.

* * * * *